Aug. 21, 1962   R. C. LUNDQUIST   3,050,291
CORE BREAKING DEVICE FOR ROTARY BORING HEADS
Filed April 11, 1960
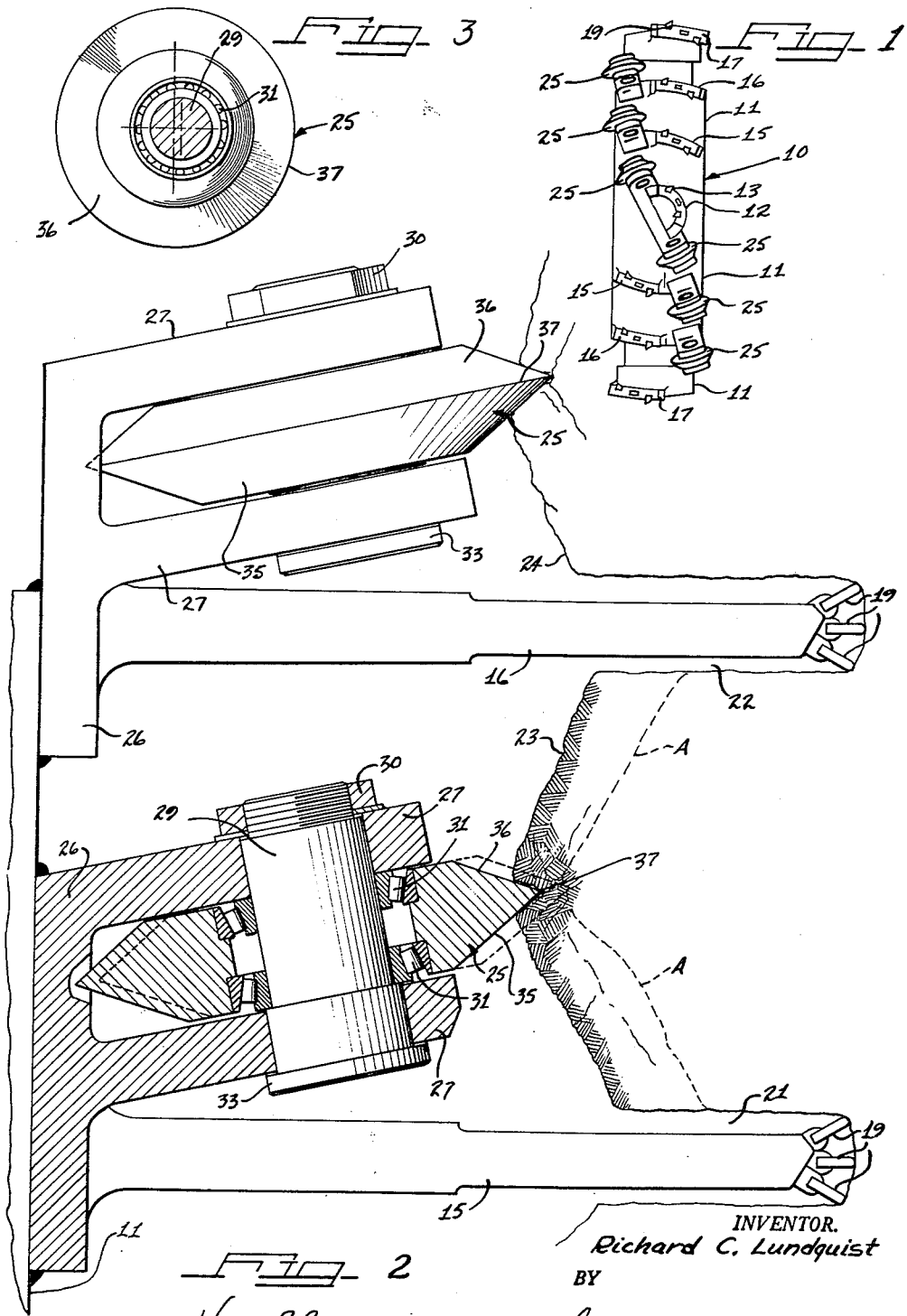
INVENTOR.
Richard C. Lundquist
BY
Hill, Sherman, Meroni, Gross & Simpson ATTYS.

United States Patent Office 3,050,291
Patented Aug. 21, 1962

3,050,291
CORE BREAKING DEVICE FOR ROTARY
BORING HEADS
Richard C. Lundquist, Palos Heights, Ill., assignor to Goodman Manufacturing Company, Chicago, Ill., a corporation of Illinois
Filed Apr. 11, 1960, Ser. No. 21,453
1 Claim. (Cl. 262—9)

This invention relates to improvements in rotary boring heads for continuous mining machines, for boring out a complete working face in coal, rock, and the like, and more particularly relates to an improved core breaker arrangement for breaking the cores between the annular kerfs cut by the rotary cutters of the boring head.

A principal object of the invention is to provide an improved core breaking means for rotary boring types of continuous mining machines operating on the principle of attacking the cores between the annular kerfs cut by the cutters of the boring head with an intermittent rolling wedging action periodically increasing in pressure during rotation of the boring head, to break the cores from the mine face.

Another object of the present invention is to improve upon the rotary boring heads for use in continuously mining coal and the like by utilizing freely rotatable core breaker disks having wedging core breaking faces having direct engagement with the mine face between the kerfs cut by the annular cutters of the boring head and so mounted as to effect random periodically increasing core breaking actions throughout the boring head during operation of the boring head.

These and other objects of the invention will appear from time to time as the following specification proceeds and with reference to the accompanying drawing wherein:

FIGURE 1 is a fragmentary front end view of a rotary boring head constructed in accordance with the principles of the present invention;

FIGURE 2 is an enlarged fragmentary view in side elevation of a portion of the boring head shown in FIGURE 1, showing the boring head in the operation of making a boring cut in a mine face, and showing one core breaker disk and its support in section; and FIGURE 3 is a top plan view of one of the core breaker disks with the shaft therefor shown in section.

In the embodiment of the invention illustrated in the drawing, 10 generally designates a boring head having a plurality of radially extending boring arms 11. Any number and spacing of boring arms may be provided, the number or spacing being dependent upon the material being mined. As herein shown, two arms 11 are provided and extend diametrically in opposite directions from a central hub (not shown) rotatably driven by suitable reduction gearing carried in a gear casing for the mining machine (not shown).

The boring head, as shown in FIGURE 1, has a central pilot cutter 12 in the form of a segment of a circle and having cutter bits 13 projecting therefrom, for cutting out a core or plug in the working face. Each boring arm 11 is provided with a series of radially spaced, forwardly projecting cutter supports 15, 16 and 17, each being arcuate in end view and conforming to the circumferential path of travel of the associated cutter support and having cutter bits 19 projecting from their forward ends. The cutter bits 19 are inclined at various angles with respect to each other and with respect to the associated cutter supports in a conventional manner, to cut clearance for the associated cutter supports and cut a series of concentric annular kerfs in the working face of the material being mined.

In FIGURE 2 of the drawings, the cutter supports 15 and 16 and the cutter bits mounted thereon are shown as cutting concentric kerfs 21 and 22 in the working face of the seam of material being mined. The outer cutter support 17 cuts a similar kerf, which defines the perimeter of the bore. The annular kerfs 21 and 22 define an annular core 23, while the annular kerf 22 and the kerf (not shown) cut by the outer cutter support 17 defines an annular core 24.

Mounted between the central pilot cutter 12 and the cutter support 15 and between the cutter supports 15 and 16 and 16 and 17, are rotary core breaker disks or rollers 25, shown as trailing the cutter supports and as having direct engagement with the core wall. The core breaker disks or rollers 25 are each mounted on a bracket member 26, bolted or otherwise secured to the front face of the boring arm 11. Each bracket member 26 has parallel spaced support arms 27 extending angularly and forwardly therefrom and forming a bifurcated support for a core breaker disk 25, mounted between said arms on a generally radially extending shaft 29 extending through said arms and perpendicularly thereto. The shaft 29 has a head 30 on one end thereof, shown as abutting the inner side of an inner arm 27 and has a nut 30 threaded on the other end thereof, for retaining said shaft to the arms 27.

The core breaker disk 25 is generally disk-like in form having oppositely disposed frusto-conical breaker faces 35 and 36 meeting at the periphery of the core breaker disk and forming a marginal or peripheral wedge-shaped cutting edge 37.

The core breaker disk 25 is shown in FIGURES 2 and 3 as being mounted on the shaft 29 on oppositely disposed antifriction thrust bearings 31, the rotational axes of which are eccentric of the axis of rotation of the core breaker disk 25. The core breaker disk 25 thus rotatably moves from the solid line position shown in FIGURE 2 to the dotted line position shown in this figure during rotation of the boring head. This forces the wedge shaped cutting edge thereof into the core to exert a progressively increasing breaking action on the core, as the boring head and core breaker disks 25 rotate.

In operation of the continuous mining machine, as the boring arms 11 of the machine are rotatably driven and advanced into the mine face by bodily movement of the machine, the cutter supports 12, 15, 16 and 17 and the cutter bits carried thereby will cut a series of concentric kerfs in the mine face, leaving a series of annular cores therebetween. As the machine is further advanced into the mine face, the core breaker disks 25 will come into engagement with the core face. This will effect rotation of the core breakers by frictional engagement of said disks with the core face and cause certain of the core breaker disks to periodically increase the wedging forces exerted thereby on the core face, while certain other of the core breaker disks will reduce the wedging action on the core face. As the core breaker disks rotatably move from the solid line position shown in FIGURE 2 to the dotted line position shown in this figure, the core will be wedged from the mine face along lines generally indicated by dashed lines A.

Thus, since the core breaker disks are all freely mounted on the boring arms, the maximum breaking action of each core breaker disk will be at random with a resultant distribution of the core breaking forces along the boring arms and reduction in power required to break the cores from the mine face and a more rapid and efficient breaking action.

While I have herein shown and described one form in which my invention may be embodied, it will be understood that various changes and modifications in the invention may be attained without departing from the spirit and scope of the novel concepts of the invention, as defined by the claim appended hereto.

I claim as my invention:

In a rotary boring head for continuous mining machines and the like, a boring arm rotatable about a generally horizontal axis and having radially spaced cutters projecting forwardly therefrom for cutting a series of concentric annular kerfs in a mine face, bracket members in association with the inner cutters of said radially spaced cutters and mounted on said boring arm in trailing relation with respect to the inner of said cutters, and each having parallel spaced support arms extending therefrom outwardly and forwardly of said boring arm into the spaces between said cutters, shafts fixedly mounted on said parallel spaced support arms and extending generally perpendicular thereto, core breaker disks mounted on said shafts for free rotation with respect thereto about axes eccentric of the centers of said shafts and extending generally radially of the axes of rotation of said boring head and perpendicular to said arms, and having wedge shaped cutting peripheries moved by said boring arm in annular paths in planes extending at acute angles with respect to the axis of rotation of said boring arm and periodically coming into wedging engagement with the core faces with increasing wedging actions by frictional engagement of said core breaker disks with the core faces, effected by rotation of said boring head and axial movement of said boring head into the mine face.

References Cited in the file of this patent

UNITED STATES PATENTS

| | | |
|---|---|---|
| 1,079,353 | Kuhn | Nov. 25, 1913 |
| 2,653,806 | Robbins | Sept. 29, 1953 |
| 2,754,099 | Tracy | July 10, 1956 |
| 2,768,820 | Russell | Oct. 30, 1956 |
| 2,823,025 | Biedess | Feb. 11, 1958 |